(12) United States Patent
Chen et al.

(10) Patent No.: US 8,996,545 B2
(45) Date of Patent: Mar. 31, 2015

(54) IN-MEMORY SPATIAL DATABASE FOR GEOCODING/GEOPROCESSING

(71) Applicants: Yingyu Chen, Shanghai (CN); Bin Dong, Shanghai (CN); Yongyuan Shen, Shanghai (CN)

(72) Inventors: Yingyu Chen, Shanghai (CN); Bin Dong, Shanghai (CN); Yongyuan Shen, Shanghai (CN)

(73) Assignee: SAP SE, Walldorf (DE), `

( * ) Notice: Subject to any disclaimer, the term of this patent is extended or adjusted under 35 U.S.C. 154(b) by 84 days.

(21) Appl. No.: 13/675,871

(22) Filed: Nov. 13, 2012

(65) Prior Publication Data

US 2013/0297556 A1    Nov. 7, 2013

(30) Foreign Application Priority Data

May 2, 2012    (CN) .......................... 2012 1 0135239

(51) Int. Cl.
*G06F 17/30* (2006.01)

(52) U.S. Cl.
CPC .......... *G06F 17/30* (2013.01); *G06F 17/30241* (2013.01)
USPC ........... 707/756; 707/602; 707/722; 707/736; 707/758; 701/23; 701/400; 706/12; 706/14

(58) Field of Classification Search
None
See application file for complete search history.

(56) References Cited

U.S. PATENT DOCUMENTS

| | | | | |
|---|---|---|---|---|
| 5,796,634 A | * | 8/1998 | Craport et al. ................. | 702/150 |
| 5,961,572 A | * | 10/1999 | Craport et al. ................. | 701/400 |
| 5,978,747 A | * | 11/1999 | Craport et al. ................. | 702/150 |
| 5,991,739 A | * | 11/1999 | Cupps et al. ................... | 705/26.8 |
| 6,134,677 A | * | 10/2000 | Lindsay ........................... | 714/42 |
| 6,330,693 B1 | * | 12/2001 | Lindsay ........................... | 714/42 |
| 7,617,246 B2 | * | 11/2009 | Koch et al. ...................... | 1/1 |
| 7,987,218 B2 | * | 7/2011 | Koepke et al. ................. | 701/532 |
| 8,065,076 B2 | * | 11/2011 | Graham et al. ................ | 701/446 |
| 8,447,787 B2 | * | 5/2013 | Koch et al. ..................... | 707/798 |
| 2003/0225725 A1 | * | 12/2003 | Miller et al. ...................... | 707/1 |
| 2005/0137994 A1 | * | 6/2005 | Fortin et al. ..................... | 706/45 |
| 2005/0261823 A1 | * | 11/2005 | Huang et al. .................. | 701/200 |
| 2006/0100912 A1 | * | 5/2006 | Kumar et al. ..................... | 705/4 |
| 2009/0063254 A1 | * | 3/2009 | Paul et al. ...................... | 705/10 |
| 2009/0063453 A1 | * | 3/2009 | Adler et al. ...................... | 707/5 |
| 2009/0276450 A1 | * | 11/2009 | Koepke et al. ................ | 707/101 |
| 2010/0146397 A1 | * | 6/2010 | Koch et al. ..................... | 715/739 |
| 2011/0161320 A1 | * | 6/2011 | Golden et al. ................. | 707/736 |
| 2011/0161334 A1 | * | 6/2011 | Sivakkolundhu et al. .... | 707/758 |

OTHER PUBLICATIONS

"Storage in a Relational Database Management System", Geodatabase, retrieved on Jan. 31, 2013 from www.esri.com/software/arcgis/geodatabase/storage-in-an-rdbms, 3 pages.

* cited by examiner

*Primary Examiner* — Hung Le
(74) *Attorney, Agent, or Firm* — Brake Hughes Bellermann LLP (57) ABSTRACT

The embodiments provide an in-memory database system having an extraction module configured to extract data (e.g., business data and address data) from one or more external data sources and transform the data into a standard format, a geocoder configured to geocode the address data including obtaining spatial data based on the address data using an internal reference table, and an internal database configured to store the internal reference table, the business data, the address data, and the spatial data.

22 Claims, 4 Drawing Sheets

FIG. 5

IN-MEMORY SPATIAL DATABASE FOR GEOCODING/GEOPROCESSING

CROSS REFERENCE TO RELATED APPLICATION

This application claims priority under 35 U.S.C. §119 to Chinese Patent Application No. 201210135239.0, filed on May 2, 2012, entitled "IN-MEMORY SPATIAL DATABASE FOR GEOCODING/GEOPROCESSING," which is incorporated herein by reference in its entirety.

TECHNICAL FIELD

This description relates to an in-memory spatial database having one or more geoprocessing features.

BACKGROUND

Geographic information systems (GIS) technology plays a relatively important role in software applications, as it provides a user an intuitive way to view, understand, and analysis multi-dimension data. However, with the development of software applications that may handle a relatively large amount of data and provide real-time or near real-time analysis, incorporating GIS technology presents its own set of challenges not encountered in conventional software application paradigms. In particular, an extract, transform, load (ETL) process is a relatively complex, time consuming process, as it provides the data for real time processing. The transactional raw data from different systems such as databases, applications or even unstructured data in data editing/spreadsheet programs may be in different data structures and different address formats. Because the whole ETL process is relatively complex and time consuming, providing the user with a real time analysis can be relatively difficult, especially in the case when some of the collected data has to be converted to spatial data (e.g., points, polylines or polygons) in order to carry out geographic processing.

Conventional methods of geographical processing involving complex spatial calculations upon relatively large amounts of data are relatively slow, especially in the case the user wishes to have access to real-time or near-time analysis reports.

SUMMARY

The embodiments provide an in-memory database system having an extraction module configured to extract data (e.g., business data and address data) from one or more external data sources and transform the data into a standard format, a geocoder configured to geocode the address data including obtaining spatial data based on the address data using an internal reference table, and an internal database configured to store the internal reference table, the business data, the address data, and the spatial data.

According to one embodiment, the extraction module may be configured to extract data from one or more external data sources in real-time via one or more real-time jobs. Alternatively, the extraction module may be configured to extract data from one or more external data sources in time intervals via one or more batch jobs.

The extraction module configured to transform the data into a standard format may include a data quality unit configured to clean and merge the data into the standard format. The data from one or more external data sources may include data having different formats.

The geocoder configured to geocode the address data may include a job status monitor configured to monitor a status of extracting and transforming by the extraction module. The job status monitor may be configured to determine that the address data is contained in the extracted data, and the geocoder may be configured to query the internal reference table using the address data as determined by the job status monitor, determine matching address data in the internal reference table, and obtain corresponding spatial data from the internal reference table.

The spatial data may include longitude and latitude information corresponding to the address data, and the spatial data may be stored in a column based format in the internal database.

The in-memory database system may also include a geoprocessing module configured to geographically process the spatial data according to spatial procedure information including performing one or more spatial queries on the spatial data according to the spatial procedure information.

In one embodiment, the geoprocessing module may be configured to transmit results of the one or more spatial queries to an outside geographic information system (GIS) application for further processing.

Also, the geoprocessing module, the extraction module, the geocoder, and the internal database may be located in a same database tier.

The in-memory database system may include a modeling module configured to create database views for the internal database. The database views may include at least one of an attribute view, analytic view and calculation view. The modeling module may be configured to transmit one or more database views to a user interface component for display.

The embodiments may also provide a method for geocoding address data by an in-memory database system. The method may include extracting, by the in-memory database system, data (e.g., business data and address data) from one or more external data sources, transforming, by the in-memory database system, the data into a standard format, geocoding, by the in-memory database system, the address data including obtaining spatial data based on the address data using an internal reference table, and storing, in the in-memory database system, the internal reference table, the business data, the address data, and the spatial data.

In one embodiment, the extracting step may extract data from one or more external data sources in real-time via one or more real-time jobs. Alternatively, the extracting step may extract data from one or more external data sources in time intervals via one or more batch jobs.

The method may further include geographically processing, by the in-memory database system, the spatial data according to spatial procedure information including performing one or more spatial queries on the spatial data according to the spatial procedure information. The method may further include creating, by the in-memory database system, database views for the internal database, the database views including at least one of an attribute view, analytic view and calculation view.

The embodiments also provide a computer program product tangibly embodied on a non-transitory computer-readable storage medium and including executable code that, when executed, is configured to cause an in-memory database system to extract data (e.g., business data and address data) from one or more external data sources, transform the data into a standard format, geocode the address data including obtaining spatial data based on the address data using an internal reference table, and store, in the in-memory database system, the internal reference table, the business data, the address data, and the spatial data.

Also, the executable code that, when executed, may be configured to cause an in-memory database system to geographically process the spatial data according to spatial procedure information including performing one or more spatial queries on the spatial data according to the spatial procedure information.

The details of one or more implementations are set forth in the accompanying drawings and the description below. Other features will be apparent from the description and drawings, and from the claims.

DETAILED DESCRIPTION

The embodiments provide an in-memory database system that may provide real-time extraction capabilities along with geoprocessing capabilities including geocoding and geoprocessing. For example, the in-memory database system may receive data from a plurality of different data sources, consolidate the data in real time (or near real time), and geocode the appropriate address data from the consolidated data, thereby obtaining spatial data such as longitude and latitude information, for example, which are then stored in the in-memory database system. Further, the in-memory database system provides geoprocessing calculation capabilities that are performed in-memory, which may increase the calculation performance. In other words, because the geographical processing logic is transferred into the in-memory database level, all the calculations are performed in-memory which may increase the calculation performance. Further, comparing with the traditional three-tier architecture of a software application, because the middle layer is relatively thin (e.g., the application server layer), the reduced network communication from the application server to the in-memory database may help improve the calculation performance and potentially reduce the deployment complexity and configuration management issues.

Figure 1:
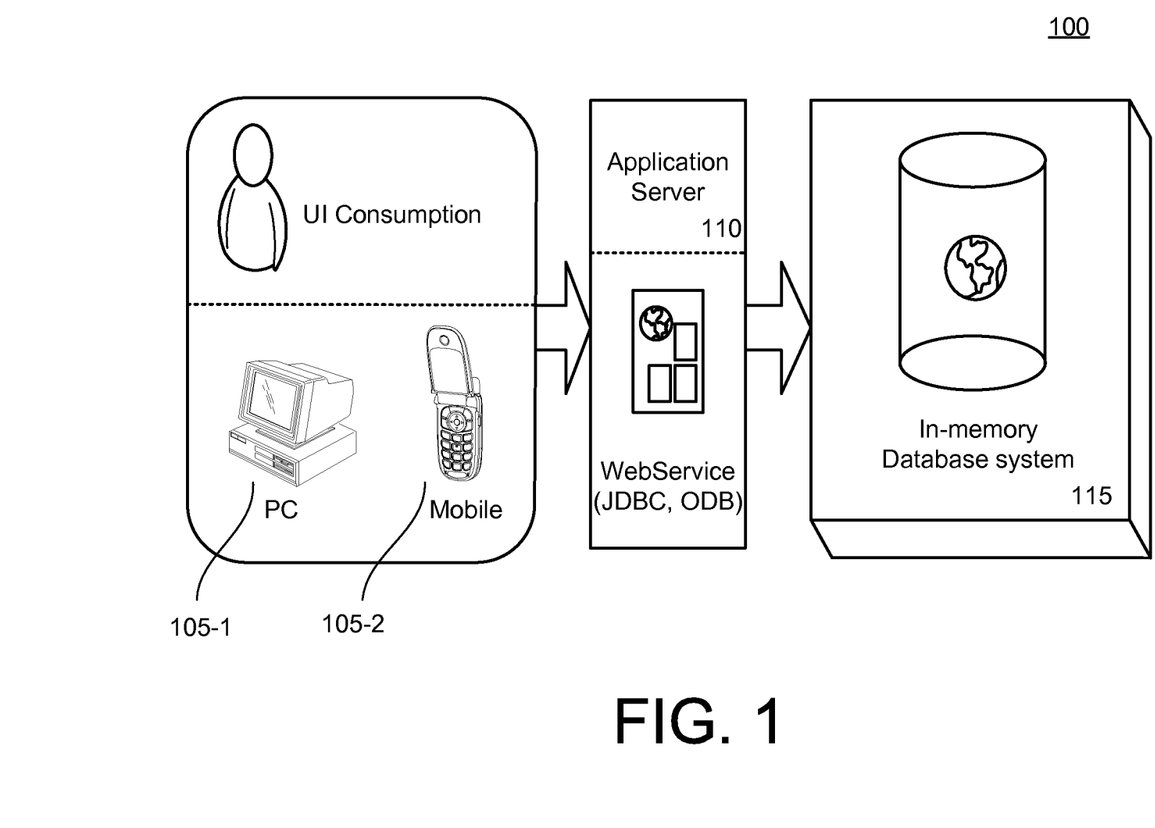
FIG. 1 illustrates a system having an in-memory database system according to an embodiment.

FIG. 1 illustrates a system 100 having an in-memory database system 115 according to an embodiment. For example, the system 100 includes a plurality of devices 105 such as a personal computer 105-1 and a mobile unit 105-2, an application server 110 providing one or more web services, and the in-memory database 115. Each device 105 may be any type of computing device having one or more processors and memory units, and the application server 110 may encompass any type of application server known in the art. Information may be exchanged between the devices 105 and the application 110, as well as the application server 110 and the in-memory database 115 according to methods that are well known in the art.

The in-memory database system 115 may be a type of database system that supports real-tem analytics and transactional processing. For example, the in-memory database system 115 may include a parallel processing data store that utilizes row-based, column-based, and/or object-based storage techniques. In one embodiment, the in-memory database system 115 may be HANA Enterprise 1.0 (any other versions) that is developed by SAP. As further explained below, the in-memory database system 115 may be equipped with geocoding and geoprocessing, which are performed at the in-memory database level as opposed to an application server level. It is noted that the in-memory database system 115 not only supports storing geographical information (e.g., GIS reference tables and spatial data) but also capabilities of executing geographical processing (e.g., spatial inquires). As a result, a user may be able to obtain more meaningful, in-depth content from the relatively large amount of extracted data. Also, as shown in FIG. 1, because the geocoding and geoprocessing calculation are performed at the in-memory database system level, the application server level can be relatively thin.

Figure 2:
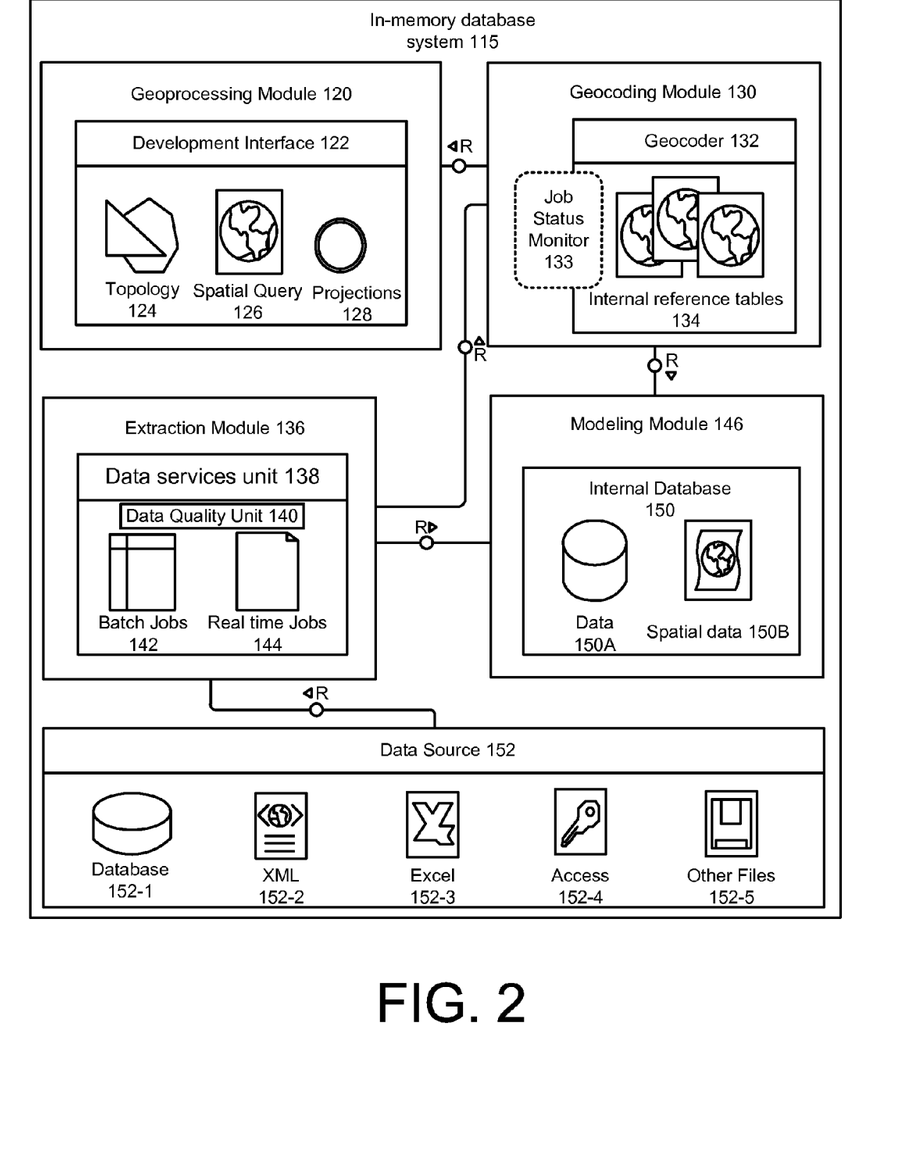
FIG. 2 illustrates the in-memory database system according to an embodiment.

FIG. 2 illustrates the in-memory database system 115 according to an embodiment. The in-memory database system 115 may include a geoprocessing module 120, a geocoding module 130, an extraction module 136, and a modeling module 146. The in-memory database system 115 may include other components known to one of ordinary skill in the art. The in-memory database system 115 may receive data from a plurality of external data sources 152 such as a database 152-1, an XML file 152-2, an Excel file 152-3, an Access file 152-4 and well as any other type of files 152-2. As shown in FIG. 2, the in-memory database system 115 may receive data having a number of different formats. The data may be any type of data relevant to the web service provided by the application server 110, which may include business data (e.g., master data and/or transactional data) and associated address data. The geoprocessing module 120, the geocoding module 130, the extraction module 136, and the modeling module 146 may be located in the same database tier. For example, referring to a three-tier application architecture, a web service may be implemented across a web (user) application tier, a server application tier, and a database tier. Conventionally, most of the computations are performed in the server application tier, and the database tier typically is associated with a storage unit for the storage of non-spatial data. However, according to the embodiment, the geocoding and/or geoprocessing functions are transferred to the database tier, which also includes the non-spatial data that is stored with the spatial data.

The extraction module 136 may be configured to extract the data from one or more of the external data sources 152, and transform the data into a standard format. Again, the data may include business data including master data and/or transactional data. The extraction module 136 may include a data services unit 138 having a data quality unit 140, batch jobs 142 and real time jobs 144. The data from the different external data sources 152 having different formats may be cleaned, merged and transformed through the data services unit 138. The data services unit 138 may provide connectivity to databases, applications, legacy systems and file formats, and the data may be extracted, transformed and loaded into the in-memory database system 115 through jobs such as the batch jobs 142 and/or the real time jobs 144. The extraction, transformation, and loading may be referred as an extract, transform, load (ETL) operation. However, the embodiments encompass any type of extraction and translation method known to one of ordinary skill in the art. The extraction module 136 may extract the data from the one or more external data sources 152 in real-time via one or more real time jobs 114, and/or the extraction module 136 may extract the data from the one or more external data sources 152 in time intervals via one or more batch jobs 142. With respect to the batch jobs 142, each batch job 142 may be scheduled to run at a certain start time, or time interval for delta uploads. In other words, the collection of data may be performed according to two different types of methods—real-time mode or batch mode. In the batch mode, the data is collected via the batch jobs 142, which collects all the data from the external data sources 152 during a set time interval. The set time interval may be adjusted, configured, or modified depending on how often data is collected. In contrast, in the real time mode, the extraction module 136 may collected the data from the data sources 152 in real time or near real time, as the information is being consumed in the data sources 152.

The data quality unit 140 may be configured to clean and merge the data into the standard format. The standard format may be a format corresponding to the format used by the in-memory database system 115. Within the ETL process, the data quality unit 140 may clean and merge the data using defined data quality control packages or self-contained logic. Also, if the data quality unit 140 recognizes address information among the data, the data quality unit 140 may perform an address cleaning process on the address information. After the data is cleaned and merged, the data may be stored in an internal database 150, as shown in the modeling module 146. However, if the data includes address data that needs to be geocoded, a geocoding process is trigged in which the address data is first provided to the geocoding module 130, which geocodes the address data and provides the geocoded address data to the internal database 150. In other words, after the extraction mode 136 has extracted, cleaned and transformed the inputted data, if address data is discovered, the geocoding process is triggered. In one embodiment, the extraction module 136 may provide a status message and/or test message for the completion of the data quality processes for each data services job (e.g., batch job 142 or real time job 144), and the extraction module 136 may mark the appropriate status message and/or test message as including address data when the corresponding job includes such information. The status of the extracting module 136 is monitored by the geocoding module 130 (e.g., the job status monitor 133) as further explained below. Also, as shown in FIG. 2, the internal database 150 may store data 150A and spatial data 150B, as well as any internal reference tables (e.g., internal reference tables 134). The data 150A may represent any type of data extracted from the extraction module 136 such as the business data (e.g., the master data and/or the transactional data), and the spatial data 150B may represent the spatial content obtained from the geocoding module 130, as further explained below.

The geocoding module 130 may be configured to geocode the address data including obtaining spatial data based on the address data using one or more internal reference tables 134. Although the internal database tables 134 are illustrated in FIG. 2 as being associated with the geocoder portion and the data 150A and the spatial data 150B are illustrated with respect to the internal database 150, the internal reference tables 134 are actually stored within the same database as the data 150A and the spatial data 150B—e.g., the internal database 150. The geocoding module 130 may include a geocoder 132 that is configured to geocode the address data, a job status monitor 133 that is configured to monitor a status of extracting and transforming by the extraction module 136 (e.g., whether the batch job 142 or the real time job 142 is completed), and the internal reference tables 134. The internal reference tables 134 may be a Worldwide GIS reference table(s) or any type of table(s) that stores regional or world map information. To model a geographical landscape, the internal reference tables 134 may use different kinds of geometric entities such as points, polylines and/or polygons to abstract and describe the real surface features such as roads, rivers and land blocks on the earth, for example. The construction of such internal reference tables 134 are known in the art.

The job status monitor 133 may be configured to monitor the status of extracting and transforming by the extraction module 136, and determine whether or not address data is contained in the extracted data. If address data is contained in the extracted data, the geocoder 132 may be configured to query the internal reference tables 134 using the address data as determined by the job status monitor 133, determine matching address data in the internal reference table 143, and obtain corresponding spatial data from the internal reference tables 134. The spatial data 150B may include longitude and latitude information corresponding to the address data, as well as any other type of information that spatially describes address data. The job status monitor 133 may be configured to monitor each job (e.g., batch job 142 and real time job 144) by checking the job status according to a specific time interval or in real time. One the extraction and transformation process is successfully completed, the job status monitor 133 may determine that address data is included in the extracted data by the status message and/or the test message being marked as including address data. Thereafter, the geocoding module 130 may filter out all the address data and trigger the geocoding process. As indicated above, the internal reference tables 134 may be stored in the internal database 150 of the in-memory database system 115, where the geocoder 132 queries all data in the internal reference tables 134 for each input address data to obtain a match point such as an address match and/or zip code match to determine the address point's most approximate coordinates. Then the returned spatial data 150B in stored directly in the in-memory database 115 such as in the internal database 150. Now, the business data 150A and the spatial data 150B are ready in the in-memory database system 115 for further calculation or processing as described below.

The geoprocessing module 120 may be configured to geographically process the spatial data 150B according to spatial procedure information including performing one or more spatial queries on the spatial data 150B according to the spatial procedure information. The spatial procedure information may be computer-readable code that specifies a number of geoprocessing operations. The spatial procedure information is further illustrated in FIG. 5 (e.g., spatial procedure information 160). In one embodiment, the geoprocessing module 120 may provide a development interface 122 for developing one or more geoprocesses including a topology 124, a spatial query 126, and projections 128, for example. Each of the topology 124, the spatial query 126 and the projections 128 may represent a subset of geoprocessing processes. The spatial query 126 may include functions such as spatial_intersects, spatial_within, spatial_overlap, spatial_contains, and/or find_nearest, for example. The topology 124 may represent topology operations between the geometric entities such as calculating intersection points, which is a common topology operation. Further, the projections 128 may represent any type of projection calculation known in the art. The topology 124, the spatial query 126, and the projections 128 may be defined by the spatial procedure information. In one embodiment, the geoprocessing module 120 may be configured to transmit results of the above operations to an outside GIS application for further processing. For example, the outside GIS application may provide a graphical display of the result information on an application display component. Alternatively, the results of the calculations may be used internally to generate a number of different views provided by the modeling module 146, which are further explained below.

In one embodiment, the spatial data 150B is stored in the internal database 150 having a column based format, which may permit a higher compression ratio and processing speed. In addition, the non-spatial data (e.g., the data 150A) is also stored in the same database with the spatial data 150B. As such, the geoprocessing module 120 may perform geoprocessing on the data 150A and the spatial data 150B jointly. In one example, a user may be able to analyze the relationship between location and sales amount, so that the user can choose a best location to expand a new branch store. The geoprocessing module 120 may transfer the results to the user interface component for display, which is independent of outside GIS vendors. Also, the geoprocessing module 120 may perform multi-thread calculations using multiple processors and core computers. Also, parallelization can significantly improve the performance during such calculations.

The modeling module 146 may be configured to create database views for the data 150A and the spatial data 150B stored in the internal database 150. The database views may include an attribute view, an analytic view and/or calculation view, for example, which are further illustrated in FIG. 5. In other words, depending on the calculation logic, a user may create procedures or different views to push the calculation into the in-memory database system 115.

Figure 3:
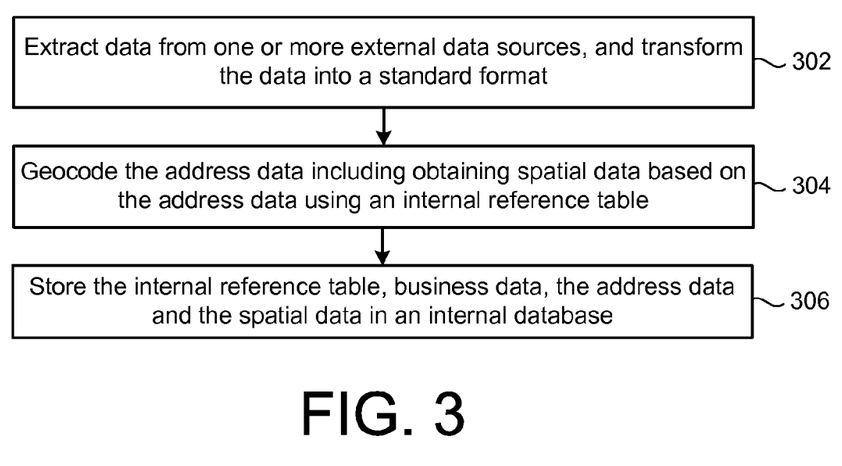
FIG. 3 depicts a flow chart illustrating example operations of the in-memory database system of FIGS. 1 and 2 according to an embodiment.

FIG. 3 is a flowchart illustrating example operations of the in-memory database system 115 of FIGS. 1 and 2 according to an embodiment. Although FIG. 3 is illustrated as a sequential, ordered listing of operations, it will be appreciated that some or all of the operations may occur in a different order, or in parallel, or iteratively, or may overlap in time.

Data from one or more external data sources may be extracted and transformed into a standard format (302). For example, the extraction module 136 may extract data from the one or more external data sources 152, and transform the data into a standard format. The data may include business data and address data. The extraction module 136 may include the data services unit 138 having a data quality unit 140, batch jobs 142 and real time jobs 144. The data from the different external data sources 152 having different formats may be cleaned, merged and transformed through the data services unit 138. The extraction, transformation, and loading may be referred as an extract, transform, load (ETL) operation, which is a term commonly used for such data gathering. However, the embodiments encompass any type of extraction and translation method known to one of ordinary skill in the art. The extraction module 136 may extract the data from the one or more external data sources 152 in real-time via one or more real time jobs 114, and/or the extraction module 136 may extract the data from the one or more external data sources 152 in time intervals via one or more batch jobs 142.

The address data may be geocoded, which may include obtaining spatial data based on the address using an internal reference table (304). For example, the geocoder 132 may geocode the address data including obtaining spatial data based on the address data using the internal reference tables 134. The gecoder 132 may be associated with the job status monitor 133 that monitors the status of extracting and transforming by the extraction module 136. Also, the job status monitor 133 may determine whether or not address data is contained in the extracted data. If address data is contained in the extracted data, the geocoder 132 may be configured to query the internal reference tables 134 using the address data as determined by the job status monitor 133, determine matching address data in the internal reference table 143, and obtain corresponding spatial data from the internal reference tables 134. The spatial data 150B may include longitude and latitude information corresponding to the address data, as well as any other type of information that spatially describes address data. The job status monitor 133 may be configured to monitor each job (e.g., batch job 142 and real time job 144) by checking the job status according to a specific time interval or in real time. One the extraction and transformation process is successfully completed, the job status monitor 133 may determine that address data is included in the extracted data by the status message and/or the test message being marked as including address data. Thereafter, the geocoding module 130 may filter out all the address data and trigger the geocoding process.

The internal reference tables 134, the business data, the address data and the spatial data may be stored in an internal database (306). For example, the internal database 150 may store the internal reference tables 134, the business data, the address data, and the spatial data.

Figure 4:
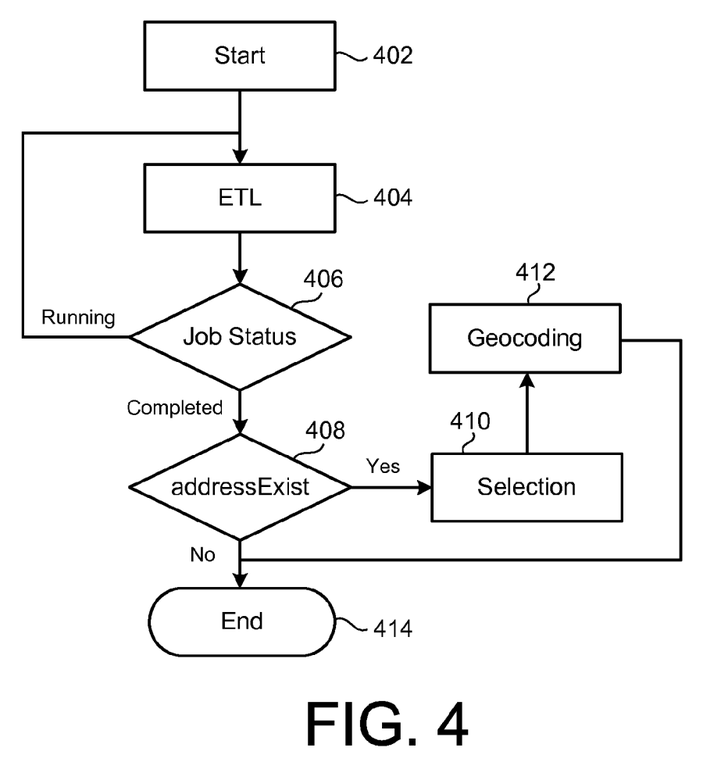
FIG. 4 depicts a flow chart illustrating example operations of the in-memory database system of FIGS. 1 and 2 according to another embodiment.

FIG. 4 is a flowchart illustrating example operations of the in-memory database system 115 of FIGS. 1 and 2 according to an embodiment. Although FIG. 4 is illustrated as a sequential, ordered listing of operations, it will be appreciated that some or all of the operations may occur in a different order, or in parallel, or iteratively, or may overlap in time.

After a collection process is started (402), and extract, transform and load (ETL) process may be performed (404). For example, the extraction module 136 may perform the ETL process on the data from the one or more external data sources 152.

A job status is determined as completed (406). As explained above, after the extraction mode 136 has extracted, cleaned and transformed the inputted data, if address data is discovered, the geocoding process is triggered. The extraction module 136 may provide a status message and/or test message for the completion of the data quality processes for each data services job (e.g., batch job 142 or real time job 144), and the extraction module 136 may mark the appropriate status message and/or test message as including address data when the corresponding job includes such information. The job status monitor 133 may be configured to monitor the status of extracting and transforming by the extraction module 136. In particular, the job status monitor 133 is configured to monitor each job by checking the job status, via the status message and/or the test message.

Once the ETL process is complete, the address data is determined as being included in the extracted data (408). For example, once the extraction and transformation process is successfully completed, the job status monitor 133 may determine that the address data is included in the extracted data by the status message and/or the test message being marked. If address data is determined as being included in the extracted data, the processing proceeds to 410. If address data is not determined as being included in the extracted data, the process is ended (414).

Once address data is determined as being included in the extracted data, the address data is selected (410) and geocoded (412). For example, the geocoding module 130 may be configured to geocode the address data including obtaining spatial data based on the address data using an internal reference database 134.

Figure 5:
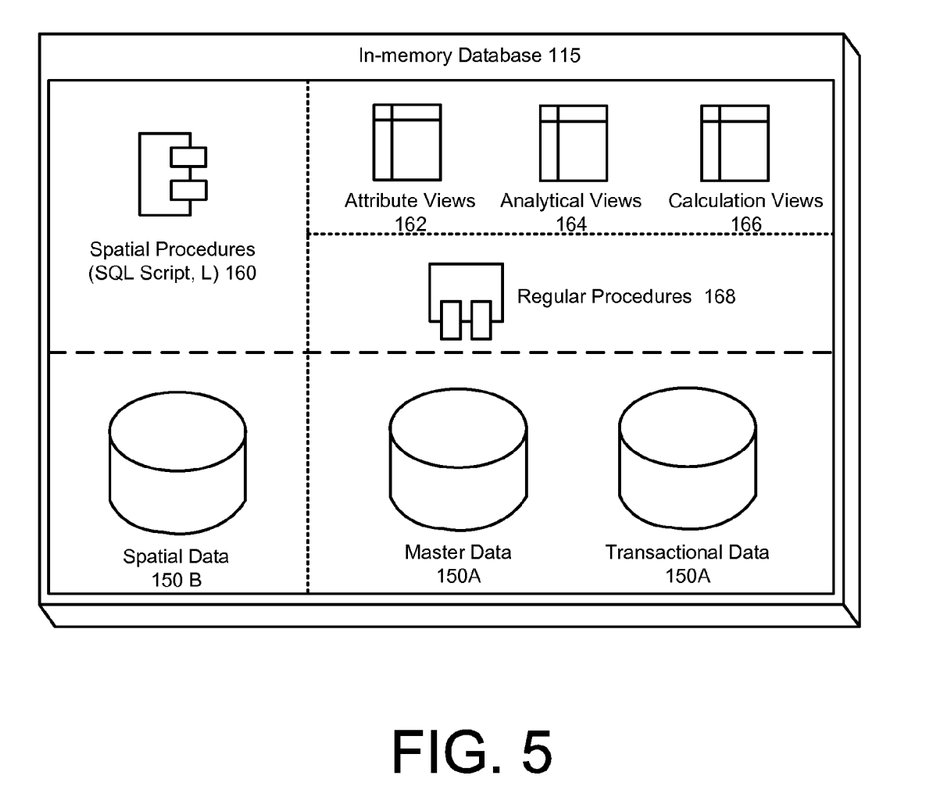
FIG. 5 illustrates the in-memory database system according to another embodiment.

FIG. 5 illustrates the in-memory database 115 according to another embodiment. For example, the in-memory database system 115 may include spatial procedures 160, the spatial data 150B and the business data 150A such as the master data 150A and the transactional data 150A, regular procedures

168, and the various different views such as the attribute views 162, analytical views 164, and the calculation views 166. The spatial procedures are procedures that relate to geoprocessing (e.g., using the geoprocessing module 120), and the regular procedures 164 relate to conventional data processing techniques. For example, the geoprocessing module 120 may be configured to geographically process the spatial data 150B according to the spatial procedure information 160, which may include performing one or more spatial queries 126 on the spatial data 150B according to the spatial procedure information 160.

According to one example, suppose a user wants to calculate the intersection points between a road network of China and a specific line. In the road network, there may be over 3.7 million features, so the amount of calculation is relatively large. In the traditional database, the processing speed is relatively slow. However, performing such a calculation in the in-memory database 115 according to the embodiments, the calculations may be performed significantly quicker (e.g., appropriately 157 seconds) to obtain all the intersection points.

For example, the extraction module 136 may be used to import the map data into the in-memory database 115, which is then stored as the internal reference table 134 as two-dimensional tables, e.g., one is to store the attribute data, such as the name of the road segment, and the other one is to store spatial data such as the coordinates of each vertex from the road segment polyline. The two tables may share the same primary key to record the mapping relationship. Here, because the internal reference table 134 may utilize column-based storage mechanism, the memory and disk space cost would be smaller than traditional databases.

As explained above, the in-memory database system 115 not only stores the spatial data 15A, but also includes capabilities of geographical processing in the same tier. Together with the in-memory technology, the in-memory database system 115 may reduce the unnecessary time cost in network transportation and disk space. In addition, L language based multithread processing may also speed up the procedure. The HASH partitioning mechanism is used to make the column table into several partitions according to the core number of the server. The program determines the intersection situation between each road segment and the specific line. Below is a sample of the spatial procedures 160 that is used to carry out such a calculation.

| CREATE FUNCTION GIS.SPATIAL |
|---|
| ( IN SPATIAL String, IN PXS Double, IN PYS Double, IN PXE Double, IN PYE Double)<br>RETURNS "Distance" Double<br>LANGUAGE LLANG<br>AS<br>BEGIN<br>   export Void main( String "SPATIAL" sp, Double "PXS" pxs, Double "PYS" pys, Double "PXE" pxe, Double "PYE" pye, Double "Distance" &distance)<br>   {<br>     Double ox = Double(0);<br>     Double oy = Double(0);<br>     distance = Double(0);<br>     Bool ints = Bool(false);<br>     /* get first segment */<br>     String p1 = sp.substring7Bit(Size(0),sp.indexOf("/"));<br>     Double px1 = Double(p1.substring7Bit(Size(0),p1.indexOf(",")));<br>     Double py1 =<br>Double(p1.substring7Bit(Size(Int32(p1.indexOf(","))+1),<br>Size(Int32(p1.getLength())-Int32(p1.indexOf(","))-1))); |

| CREATE FUNCTION GIS.SPATIAL |
|---|
|      String tempsp =<br>sp.substring7Bit(Size(Int32(sp.indexOf("/"))+1),Size(Int32(sp.getLength())-Int32(sp.indexOf("/"))-1));<br>     String p2 = tempsp.substring7Bit(Size(0),tempsp.indexOf("/"));<br>     Double px2 = Double(p2.substring7Bit(Size(0),p2.indexOf(",")));<br>     Double py2 =<br>Double(p2.substring7Bit(Size(Int32(p2.indexOf(","))+1),<br>Size(Int32(p2.getLength())-Int32(p2.indexOf(","))-1)));<br>     /* calculate the distance between the point to the segment */<br>     if (<br>     math::max(pxs,pxe) >= math::min(px1,px2) &&<br>     math::max(px1,px2) >= math::min(pxs,pxe) &&<br>     math::max(pys,pye) >= math::min(py1,py2) &&<br>     math::max(py1,py2) >= math::min(pys,pye) &&<br>     ((px1-pxs)*(pye-pys) − (pxe-pxs)*(py1-pys)) *<br>     ((pxe-pxs)*(py2-pys) − (px2-pxs)*(pye-pys)) >= Double(0) &&<br>     ((pxs-px1)*(py2-py1) − (px2-px1)*(pys-py1)) *<br>     ((px2-px1)*(pye-py1) − (pxe-px1)*(py2-py1)) >= Double(0) ){<br>     /* there's intersections, calculation the intersect posibiton */<br>     ints = Bool(true);<br>     ox = ((pxs-pxe)*(px1*py2 − px2*py1) − (px1-px2) * (pxs*pye − pxe*pys))/((px1-px2)*(pys-pye)−(pxs-pxe)*(py1-py2));<br>     oy = ((pys-pye)*(px1*py2 − px2*py1) − (pxs*pye − pxe*pys)*(py1-py2)) / ((pys-pye)*(px1-px2) − (pxs-pxe)*(py1-py2));<br>     distance =<br>Double(String(math::round(DecFloat34(ox),0)).append(".").append(String(math::round(DecFloat34(oy),0))));<br>     }<br>     while ( !ints && tempsp.indexOf("/") != tempsp.getLength( ))<br>     {<br>       p1 = p2;<br>       px1 = px2;<br>       py1 = py2;<br>       tempsp =<br>tempsp.substring7Bit(Size(Int32(tempsp.indexOf("/"))+1),<br>Size(Int32(tempsp.getLength( ))-Int32(tempsp.indexOf("/"))-1));<br>       p2 = tempsp.substring7Bit(Size(0),tempsp.indexOf("/"));<br>       px2 = Double(p2.substring7Bit(Size(0),p2.indexOf(",")));<br>       py2 =<br>Double(p2.substring7Bit(Size(Int32(p2.indexOf(","))+1),<br>Size(Int32(p2.getLength( ))-Int32(p2.indexOf(","))-1)));<br>       if (<br>       math::max(pxs,pxe) >= math::min(px1,px2) &&<br>       math::max(px1,px2) >= math::min(pxs,pxe) &&<br>       math::max(pys,pye) >= math::min(py1,py2) &&<br>       math::max(py1,py2) >= math::min(pys,pye) &&<br>       ((px1-pxs)*Double(pye-pys) − (pxe-pxs)*(py1-pys)) *<br>       ((pxe-pxs)*Double(py2-pys) − (px2-pxs)*(pye-pys)) >= Double(0) &&<br>       ((pxs-px1)*Double(py2-py1) − (px2-px1)*(pys-py1)) *<br>       ((px2-px1)*Double(pye-py1) − (pxe-px1)*(py2-py1)) >= Double(0) ){<br>       /* there's intersections, calculation the intersect posibiton */<br>       ints = Bool(true);<br>       ox = ((pxs-pxe)*(px1*py2 − px2*py1) − (px1-px2) * (pxs*pye − pxe*pys))/((px1-px2)*(pys-pye)−(pxs-pxe)*(py1-py2));<br>       oy = ((pys-pye)*(px1*py2 − px2*py1) − (pxs*pye − pxe*pys)*(py1-py2)) / ((pys-pye)*(px1-px2) − (pxs-pxe)*(py1-py2));<br>       distance =<br>Double(String(math::round(DecFloat34(ox),0)).append(".").append(String(math::round(DecFloat34(oy),0))));<br>       }<br>     }<br>   }<br>END; |

In summary, the in-memory database system 115 supports storing both attribute data and spatial data together in the same database, as well as joint processing operating on both the attribute data and the spatial data. Also, the in-memory database system 115 supports on-the-fly data consolidation from different data sources, batch geocoding, and reverse geocoding between descriptive address data and the geographic coordinates. The in-memory database system 115 may improve the geographic processing performance based on in-memory and parallel computing technology. Also, the in-memory database system 115 may reduce the landscape complexity by putting the calculation logic for the business data and/or the spatial data into the database level, thereby reducing the interaction between the middle layer (e.g. application) and the database layer, which in return may improve the whole application performance as well as reduce deployment effort.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium and executable by at least one processor, the system comprising:
    an in-memory database configured to interface with an application server hosting one or more web services, the in-memory database configured to perform extract, transform, and load (ETL) operations to collect data from one or more external data sources and perform geocoding and geoprocessing on the data such that the geocoding and geoprocessing are not performed at the application server but rather at a database level represented by the in-memory database, the in-memory database including,
    an extraction module configured to cause the at least one processor to perform the ETL operations including extracting the data from the one or more external data sources, and transforming the data into a standard format associated with the in-memory database, the data including business data and address data;
    a geocoder configured to cause the at least one processor to geocode the address data including obtaining spatial data based on the address data using an internal reference table stored in the in-memory database, the spatial data including geographical coordinate data corresponding to the address data; and
    a geoprocessing module configured to cause the at least one processor to geographically process the spatial data including calculating geographical topology information using the geocoded address data including the geographical coordinate data; and
    a storage configured to store the spatial data and the business data.

2. The system of claim 1, wherein the extraction module is configured to extract the data from the one or more external data sources in real-time via one or more real-time jobs.

3. The system of claim 1, wherein the extraction module is configured to extract the data from the one or more external data sources in time intervals via one or more batch jobs.

4. The system of claim 1, wherein the extraction module includes:
    a data quality unit configured to clean and merge the data into the standard format.

5. The system of claim 1, wherein the data from the one or more external data sources includes data having different formats.

6. The system of claim 1, wherein the geocoder configured to geocode the address data includes:
    a job status monitor configured to monitor a status of the ETL operations of by the extraction module, the job status monitor configured to determine that the address data is contained in the extracted data, wherein the geocoder is configured to query the internal reference table using the address data as determined by the job status monitor, determine matching address data in the internal reference table, and obtain corresponding spatial data from the internal reference table.

7. The system of claim 1, wherein the spatial data includes longitude and latitude information corresponding to the address data.

8. The system of claim 1, wherein the storage of the in-memory database includes a column-based storage, a row-based storage, and an object-based storage, the spatial data being stored in the column-based storage.

9. The system of claim 1, wherein the geoprocessing module is configured to geographically process the spatial data according to spatial procedure information including performing one or more spatial queries on the spatial data according to the spatial procedure information.

10. The system of claim 9, wherein the geoprocessing module is configured to transmit results of the one or more spatial queries to an outside geographic information system (GIS) application for further processing.

11. The system of claim 1, wherein the geoprocessing module, the extraction module, the geocoder, and the storage are located in a same database tier.

12. The system of claim 1, wherein the in-memory database further includes:

a modeling module configured to create database views for the business data and the spatial data stored in the storage, the database views including at least one of an attribute view, analytic view and calculation view.

13. The system of claim 12, wherein the modeling module is configured to transmit one or more database views to a user interface component for display.

14. The system of claim 1, wherein the spatial data includes earth based real surface feature information, earth based geographical coordinate information, world map information, and regional map information corresponding to the address data.

15. The system of claim 1, wherein calculating geographical topology information includes calculating intersection points between one or more real surface features and a specific line using the geocoded address data including the geographical coordinate data.

16. A method for geocoding address data by an in-memory database, the method comprising:

performing, by an in-memory database, extract, transform, and load (ETL) operations, on data from one or more external data sources including transforming the data into a standard format associated with the in-memory database;

triggering, by the in-memory database, a geocoding process if address data is discovered within the data;

geocoding, by the in-memory database, the address data including obtaining spatial data based on the address data using a geographical information system (GIS) table stored in the in-memory database such that the geocoding is performed at a database level represented by the in-memory database as opposed to an application server, the spatial data including geographical coordinate data corresponding to the address data;

geographically processing, by the in-memory database, the spatial data including calculating geographical topology information using the geocoded address data including the geographical coordinate data such that the geographically processing is performed at the database level as opposed to the application server; and storing the spatial data and the data in a storage of the in-memory database.

17. The method of claim 16, wherein the performing the ETL operations include extracting the data from the one or more external data sources in real-time via one or more real-time jobs.

18. The method of claim 16, wherein the performing the ETL operations include extracting the data from the one or more external data sources in time intervals via one or more batch jobs.

19. The method of claim 16, wherein the geographically processing includes geographically processing the spatial data according to spatial procedure information including performing one or more spatial queries on the spatial data according to the spatial procedure information.

20. The method of claim 16, further comprising:

creating, by the in-memory database, database views for the data and the spatial data stored in the storage of the in-memory database, the database views including at least one of an attribute view, analytic view and calculation view.

21. A computer program product tangibly embodied on a non-transitory computer-readable storage medium and including executable code that, when executed, is configured to cause at least one processor to:

perform, by an in-memory database, extract, transform, and load (ETL) operations on business data from one or more data sources including executable code to extract the business data from the one or more external data sources and transform the business data into a format associated with the in-memory database;

trigger, by the in-memory database, a geocoding process if address data is discovered within the extracted business data;

geocode, by the in-memory database, the address data including obtaining spatial data based on the address data using a map reference table stored in the in-memory database such that the geocoding is performed at a database level represented by the in-memory database as opposed to an application server, the spatial data including geographical coordinate data corresponding to the address data; and perform, by the in-memory database, geoprocessing on the business data and the spatial data jointly such that correlations between locations and the business data are derived, the geoprocessing being performed at the database level as opposed to the application server.

22. The computer program product of claim 21, wherein the business data includes sales data associated with existing locations, and the derived correlations predict one or more new locations based on the sales data.

* * * * *